United States Patent
Kumaki et al.

(10) Patent No.: US 10,118,978 B2
(45) Date of Patent: Nov. 6, 2018

(54) VINYL ALCOHOL POLYMER AND PRODUCTION METHOD THEREOF, ADDITIVE FOR DRILLING MUD, DRILLING MUD, ADDITIVE FOR DRILLING CEMENT SLURRY, AND DRILLING CEMENT SLURRY

(71) Applicant: KURARAY CO., LTD., Kurashiki-shi (JP)

(72) Inventors: Yosuke Kumaki, Kurashiki (JP); Yasutomo Saito, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 183 days.

(21) Appl. No.: 15/021,872

(22) PCT Filed: Sep. 11, 2014

(86) PCT No.: PCT/JP2014/074107
§ 371 (c)(1),
(2) Date: Mar. 14, 2016

(87) PCT Pub. No.: WO2015/037672
PCT Pub. Date: Mar. 19, 2015

(65) Prior Publication Data
US 2016/0229936 A1  Aug. 11, 2016

(30) Foreign Application Priority Data
Sep. 13, 2013 (JP) ................. 2013-190475

(51) Int. Cl.
| | |
|---|---|
| *C09K 8/22* | (2006.01) |
| *E21B 43/00* | (2006.01) |
| *C08F 216/06* | (2006.01) |
| *C08F 8/00* | (2006.01) |
| *C09K 8/035* | (2006.01) |
| *C09K 8/467* | (2006.01) |
| *C04B 24/16* | (2006.01) |
| *C04B 28/02* | (2006.01) |
| *C04B 24/26* | (2006.01) |
| *C09K 8/44* | (2006.01) |
| *C04B 103/00* | (2006.01) |
| *C04B 103/46* | (2006.01) |

(52) U.S. Cl.
CPC ............ *C08F 216/06* (2013.01); *C04B 24/16* (2013.01); *C04B 24/2623* (2013.01); *C04B 28/02* (2013.01); *C08F 8/00* (2013.01); *C09K 8/035* (2013.01); *C09K 8/44* (2013.01); *C09K 8/467* (2013.01); *C04B 2103/0055* (2013.01); *C04B 2103/0062* (2013.01); *C04B 2103/46* (2013.01)

(58) Field of Classification Search
CPC .......... C09K 8/035; C09K 8/44; C09K 8/467; C09K 8/487; C04B 24/16; C04B 24/2623; C04B 2103/0055; C04B 2103/0062; C04B 2103/46; C04B 28/02

USPC ................................................ 507/124, 230
See application file for complete search history.

(56) References Cited

U.S. PATENT DOCUMENTS

| | | | |
|---|---|---|---|
| 4,569,395 | A | 2/1986 | Carpenter |
| 4,967,839 | A | 11/1990 | Carpenter et al. |
| 5,061,387 | A | 10/1991 | Victorius |
| 5,710,211 | A | 1/1998 | Sato et al. |
| 6,656,266 | B1 | 12/2003 | Barlet-Gouedard et al. |
| 6,739,806 | B1 | 5/2004 | Szymanski et al. |

(Continued)

FOREIGN PATENT DOCUMENTS

| | | |
|---|---|---|
| JP | 46-4390 | 2/1971 |
| JP | 9-100319 | 4/1997 |
| JP | 9-100320 | 4/1997 |

(Continued)

OTHER PUBLICATIONS

International Search Report dated Oct. 7, 2014 in PCT/JP14/74107 Filed Sep. 11, 2014.

*Primary Examiner* — Aiqun Li
(74) *Attorney, Agent, or Firm* — Oblon, McClelland, Maier & Neustadt, L.L.P.

(57) ABSTRACT

Provided by the present invention is a vinyl alcohol polymer crosslinked by a structure represented by the following formula (1) and/or a disulfide structure, in which the vinyl alcohol polymer is not completely dissolved in a mixture prepared by: adding the vinyl alcohol polymer to water so as to give a concentration of 4% by mass; and stirring at 95° C. for 3 hrs. in the formula (1), $R^1$, $R^2$ and $R^3$ each independently represent a hydrogen atom or a substituted or unsubstituted hydrocarbon group having 8 or less carbon atoms. Also provided include an additive for a drilling mud containing the vinyl alcohol polymer, a drilling mud containing the vinyl alcohol polymer as an additive, an additive for a drilling cement slurry containing the vinyl alcohol polymer, and a drilling cement slurry containing the vinyl alcohol polymer as an additive.

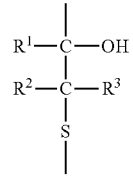

(1)

12 Claims, No Drawings

(56) References Cited

U.S. PATENT DOCUMENTS

2010/0298175 A1* 11/2010 Ghassemzadeh .... C09K 8/5045
   507/124
2014/0030350 A1    1/2014 Ashrafi et al.

FOREIGN PATENT DOCUMENTS

| JP | 10-60439 | 3/1998 |
|----|----------|--------|
| WO | 2012/101455 A1 | 8/2012 |
| WO | 2013/105188 A1 | 7/2013 |

* cited by examiner

VINYL ALCOHOL POLYMER AND PRODUCTION METHOD THEREOF, ADDITIVE FOR DRILLING MUD, DRILLING MUD, ADDITIVE FOR DRILLING CEMENT SLURRY, AND DRILLING CEMENT SLURRY

TECHNICAL FIELD

The present invention relates to a specific vinyl alcohol polymer crosslinked by a specific structure, a production method thereof, and an additive for a drilling mud useful for applications in well drilling, etc., containing the vinyl alcohol polymer, a drilling mud, an additive for a drilling cement slurry, and a drilling cement slurry.

BACKGROUND ART

In wells for collecting petroleum and natural gas buried resources, use of a drilling mud and a drilling cement slurry has been conventionally known. The functions of the drilling mud may involve: transporting drilled clasts and drilling wastes; lubricating bits and drill pipes; filling in holes on the porous ground; and balancing out the reservoir pressure that results from the hydrostatic pressure. Such a drilling mud is required to have a great specific gravity, which may be attained by adding preferably, barite, salt or clay. In addition, the drilling mud is also required to have temperature stability, and appropriate flow characteristics that are not significantly affected by variation of concentrations of electrolytes. In order to achieve these performances, adjusting the viscosity of the drilling mud, and inhibiting dissipation of the moisture contained in the drilling mud (hereinafter, may be also referred to as "dehydration") may be an exemplary measure. Thus, a method which includes adding a polymer, specifically, for example, starch, a starch ether (carboxymethyl starch, etc.) carboxymethyl cellulose, carboxymethyl hydroxyethyl cellulose or the like as an additive is usually adopted. However, these additives may extremely elevate the viscosity of the drilling mud, whereby injection by the pump may be difficult. Moreover, at a temperature of higher than about 120° C. (in the cases of a starch and derivatives thereof) or at a temperature of 140 to 150° C. (in the cases of carboxymethyl cellulose and carboxymethyl hydroxyethyl cellulose) it may be inconvenient that inhibition of dehydration may not be sufficient.

On the other hand, the drilling cement slurry has been used for filling in tubular void portions between the stratum and the casing pipe installed in the well with a cement material to provide hardened corresponding portions. In general, the drilling cement slurry is fed into tubular void portions between the stratum and the casing pipe with a pump, and then the tubular void portions are sequentially filled with the drilling cement slurry from the well bottom, followed by hardening. Thus, the casing pipe is fixed in the well, thereby protecting the inside wall of the well. The drilling cement slurry is required to be readily injected by a pump. In other words, the drilling cement slurry is required to have extremely low viscosity, and not to be accompanied by separation.

Conventionally employed drilling cement slurries for use in cementing wells contain various types of additives. These additives are exemplified by a cement accelerator, a cement retarder, a dispersant, a cement dehydration-reducing agent, a low-density additive, high-density additive, an cement-expanding agent, a cement strength stabilizer and a silica powder and the like which have been used in combination depending on the well conditions and purposes.

In cementing a well, a defect is likely to occur in a cemented part by material segregation, running into cracks in the well, and the like. To address such a defect, walnut shells, cotton seeds, clay minerals, polymer compounds and the like have conventionally been added. In particular, vinyl alcohol polymers are a well-known dehydration-reducing agent. Patent Document 1 discloses a method in which a vinyl alcohol polymer having a degree of saponification of at least 95 mol % is used, and Patent Document 2 discloses a method in which a vinyl alcohol polymer having a degree of saponification of 92 mol % or less is used. However, also according to these methods, dehydration-reducing performances at high temperatures in particular, may be insufficient, or feeding of the drilling cement slurry by the pump may be difficult through elevating the viscosity.

In order to improve the dehydration-reducing performances, and/or to moderate the viscosity elevation of the drilling cement slurry at high temperatures: Patent Document 3 discloses use of a vinyl alcohol polymer crosslinked by melamine-formaldehyde; Patent Document 4 discloses use of a vinyl alcohol polymer produced by crosslinking of hydroxyl groups of a vinyl alcohol polymer by an acetalization reaction or the like; and Patent Document 5 discloses use of a vinyl alcohol polymer produced by pH-sensitive crosslinking using a boron ion, etc. Although a given effect of improving the dehydration-reducing performances at high temperatures was achieved in every case, it is necessary to carry out the reaction with the crosslinking agent after a water soluble vinyl alcohol polymer was produced beforehand, leading to an economical drawback.

PRIOR ART DOCUMENTS

Patent Documents

Patent Document 1: U.S. Pat. No. 4,569,395
Patent Document 2: U.S. Pat. No. 4,967,839
Patent Document 3: U.S. Pat. No. 5,061,387
Patent Document 4: U.S. Pat. No. 6,656,266
Patent Document 5: U.S. Pat. No. 6,739,806

SUMMARY OF THE INVENTION

Problems to be Solved by the Invention

An objective of the present invention is to provide a crosslinked vinyl alcohol polymer being capable of moderating dehydration at high temperatures and viscosity elevation in a drilling mud and a drilling cement slurry for use in well drilling and the like. Furthermore, another objective of the present invention is to provide a production method of a vinyl alcohol polymer which enables the crosslinked vinyl alcohol polymer to be provided in an economically superior manner. Moreover, still another objective of the present invention is to provide an additive for a drilling mud, a drilling mud, an additive for a drilling cement slurry and a drilling cement slurry which are useful for well drilling and the like and which contain the crosslinked vinyl alcohol polymer.

Means for Solving the Problems

The present inventors thoroughly studied in order to achieve the objectives described above, and consequently found that a vinyl alcohol polymer that is crosslinked by a specific structure and is insoluble in water enables a drilling mud and a drilling cement slurry to be readily obtained in which dehydration at high temperatures and viscosity elevation are moderated. Thus, as a result of further investigations based on these findings, the present invention was accomplished.

More specifically, an aspect of the present invention is directed to a vinyl alcohol polymer crosslinked by a structure represented by the following formula (1) and/or a disulfide structure, wherein the vinyl alcohol polymer is not completely dissolved in a mixture prepared by: adding the vinyl alcohol polymer to water so as to give a concentration of 4% by mass; and stirring at 95° C. for 3 hrs.

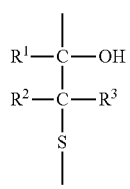

(1)

In the formula (1), $R^1$, $R^2$ and $R^3$ each independently represent a hydrogen atom or a hydrocarbon group having 8 or less carbon atoms which may have a substituent.

The vinyl alcohol polymer is preferably powdery, and the vinyl alcohol polymer more preferably passes through a 10-mesh sieve according to JIS.

According to the vinyl alcohol polymer crosslinked by the structure represented by the above formula (1) (hereinafter, may be also referred to as "vinyl alcohol polymer (A)"), it is preferred that the structure represented by the above formula (1) is formed by a reaction of an epoxy group and a mercapto group.

According to the vinyl alcohol polymer crosslinked by the disulfide structure (hereinafter, may be also referred to as "vinyl alcohol polymer (B)"), it is preferred that the disulfide structure is formed by a coupling reaction of mercapto groups.

Another aspect of the present invention is directed to a production method of a vinyl alcohol polymer as in the following.

A production method of the vinyl alcohol polymer (A), the method including (a) a step of reacting a first vinyl alcohol polymer having an epoxy group on a side chain thereof, with a first compound having at least two mercapto groups per molecule.

A production method of the vinyl alcohol polymer (A), the method including (b) a step of reacting a second vinyl alcohol polymer having a mercapto group on the side chain thereof, with a second compound having at least two epoxy groups per molecule.

A production method of the vinyl alcohol polymer (B), the method including (c) a step of reacting second vinyl alcohol polymers having a mercapto group on the side chain thereof, with one another.

In the step of the reacting, it is preferred that a first vinyl ester polymer having an epoxy group on the side chain thereof is saponified in the presence of the first compound by using an alkali catalyst so as to allow a saponification reaction in a vinyl ester unit and a reaction of an epoxy group and a mercapto group to concomitantly proceed.

In the step (b) of the reacting, it is preferred that a second vinyl ester polymer having a thioester group on the side chain thereof is saponified in the presence of the second compound by using an alkali catalyst so as to allow a saponification reaction in a vinyl ester unit and a reaction of the epoxy group with a mercapto group generated by the saponification reaction on the thioester group to concomitantly proceed.

In the step (c) of the reacting, it is preferred that a second vinyl ester polymer having a thioester group on the side chain thereof is saponified by using an alkali catalyst so as to allow a saponification reaction in a vinyl ester unit and a coupling reaction of mercapto groups generated by the saponification reaction on the thioester group to concomitantly proceed.

Still another aspects of the present invention include:
an additive for a drilling mud containing the vinyl alcohol polymer;
a drilling mud containing the vinyl alcohol polymer as an additive;
an additive for a drilling cement slurry containing the vinyl alcohol polymer; and
a drilling cement slurry containing the vinyl alcohol polymer as an additive.

Effects of the Invention

According to the aspect of the present invention, a crosslinked vinyl alcohol polymer is provided which is capable of moderating dehydration at high temperatures and viscosity elevation in a drilling mud and a drilling cement slurry for use in well drilling and the like. Furthermore, according to the another aspect of the present invention, a production method of a vinyl alcohol polymer is provided which can provide the crosslinked vinyl alcohol polymer in an economically superior manner. Moreover, according to other aspects of the present invention, an additive for a drilling mud, a drilling mud, an additive for a drilling cement slurry and a drilling cement slurry, which contain the crosslinked vinyl alcohol polymer, and are useful for well drilling, and the like.

DESCRIPTION OF EMBODIMENTS

Hereinafter, embodiments of the present invention will be described in detail.

Vinyl Alcohol Polymer

The vinyl alcohol polymer according to an embodiment of the present invention is crosslinked by a structure represented by the above formula (1) and/or a disulfide structure, and the vinyl alcohol polymer is not completely dissolved (the component insoluble in water remains) in a mixture prepared by: adding the vinyl alcohol polymer to water so as to give a concentration of 4% by mass; and stirring at 95° C. for 3 hrs. By using such a vinyl alcohol polymer that is crosslinked by a specific structure and is insoluble in water, a drilling mud and a drilling cement slurry in which dehydration at high temperatures and viscosity increase are moderated can be readily obtained. Although the present invention is not in any way bound by the theory, the benefit is presumed to result from the state of the presence of the water-insoluble vinyl alcohol polymer in the drilling mud or the drilling cement slurry, i.e., a state in which the vinyl alcohol polymer molecules are accompanied by the water molecules, whereby exhibiting superior characteristics for use in well drilling would be enabled. The superior characteristics involve: a capability of effectively filling in, for example, holes on the porous ground by the drilling mud and the drilling cement slurry containing the vinyl alcohol polymer according to the embodiment of the present invention; effective inhibition of dehydration on the wall of the stratum; and the like.

In the structure represented by the above formula (1), $R^1$, $R^2$ and $R^3$ each independently represent a hydrogen atom, or a substituted or unsubstituted hydrocarbon group having 8 or less carbon atoms. Since the effects of the invention may be more markedly exhibited, $R^1$, $R^2$ and $R^3$ in the above formula (1) each independently represent preferably a hydrogen atom or an unsubstituted hydrocarbon group having 8 or less carbon atoms, and more preferably a hydrogen atom, a methyl group, an ethyl group, a propyl group or a butyl group. Still more preferably, all $R^1$, $R^2$ and $R^3$ represent a hydrogen atom. It is to be noted that the substituent is exemplified by a halogen atom and the like.

Provided that the vinyl alcohol polymer according to the embodiment of the present invention is crosslinked by the structure represented by the above formula (1), the structure is preferably formed by a reaction of an epoxy group with a mercapto group, owing to, e.g., easy preparation of the vinyl alcohol polymer according to the embodiment of the present invention. The reaction may be carried out, in the presence of the epoxy group and the mercapto group, by as needed, heating and/or adding a catalyst.

Furthermore, provided that the vinyl alcohol polymer according to the embodiment of the present invention is crosslinked by a disulfide structure (—S—S—), the structure is preferably formed by a coupling reaction of mercapto groups, owing to, e.g., easy preparation of the vinyl alcohol polymer according to the embodiment of the present invention. The coupling reaction may be carried out by carrying out a heat treatment in the presence of the mercapto group. Conditions of the heat treatment may involve, for example, the reaction temperature within the range of 50 to 180° C., and the reaction time period within the range of 0.5 to 20 hrs. Since the coupling reaction is accelerated in the presence of oxygen, the heat treatment is preferably carried out with an oxygen ($O_2$) concentration falling within the range of 1 to 20 volume %. Also, this reaction may be carried out concomitantly with a saponification reaction in the vinyl ester unit using an alkali catalyst.

Typical examples of the vinyl alcohol polymer according to the embodiment of the present invention include the unit substantially consisting of only a vinyl alcohol unit, or only a vinyl alcohol unit and a vinyl ester unit, at parts other than the structure represented by the above formula (1) and/or the disulfide structure.

Although the form of the vinyl alcohol polymer according to the embodiment of the present invention is not particularly limited, the vinyl alcohol polymer is preferably in a powdery form taking into consideration the use for well drilling as described later. Although the powder size is not particularly limited, the powder passes through preferably a 10-mesh sieve according to JIS, more preferably a 16-mesh sieve according to JIS, and particularly preferably a 30-mesh sieve according to JIS. Such a vinyl alcohol polymer in a powdery form makes it easy to sufficiently inhibit the dehydration at high temperatures when used as the additive for a drilling mud (additive for preparing a desired drilling mud through the addition thereof) or a additive for a drilling cement slurry (additive for preparing a desired drilling cement slurry through the addition thereof).

Production Method of Vinyl Alcohol Polymer

Although a production method of the vinyl alcohol polymer according to the embodiment of the present invention is not particularly limited, the following method is preferred since the vinyl alcohol polymer according to the embodiment of the present invention can be readily obtained. More specifically, provided that the vinyl alcohol polymer according to the embodiment of the present invention is crosslinked by the structure represented by the above formula (1) (vinyl alcohol polymer (A)), the vinyl alcohol polymer may be preferably produced by:

1. a method including (a) a step of reacting a first vinyl alcohol polymer having an epoxy group on a side chain thereof, with a first compound having at least two mercapto groups per molecule; or
2. a method including (b) a step of reacting a second vinyl alcohol polymer having a mercapto group on the side chain thereof, with a second compound having at least two epoxy groups per molecule.

Also, the vinyl alcohol polymer may be produced by:

3. a method including (x) a step of reacting third vinyl alcohol polymers having both an epoxy group and a mercapto group on the side chain thereof, with one another.

On the other hand, provided that the vinyl alcohol polymer according to the embodiment of the present invention is crosslinked by a disulfide structure (vinyl alcohol polymer (B)) the vinyl alcohol polymer is preferably produced by 4. a method including (c) a step of reacting second vinyl alcohol polymers having a mercapto group on the side chain thereof, with one another.

in the case of the methods 3 and 4, the reacted vinyl alcohol polymers may be either of the same type, or of different types.

The reaction in each method described above may be carried out either under a solvent-free condition, or in the presence of the solvent. In a case where the reaction is carried out in the presence of a solvent, the solvent type is not particularly limited, but when a compound having at least two mercapto groups per molecule, and/or a compound having at least two epoxy groups per molecule are/is used, a solvent being capable of dissolving or swelling the same is preferred. Specific examples of the solvent include: alcohols such as methanol, ethanol, n-propyl alcohol and n-butyl alcohol; aromatic hydrocarbons such as benzene, toluene and xylene; ethers such as tetrahydrofuran, dioxane and diethyl ether; aliphatic hydrocarbons such as n-hexane; and the like, and these solvents may be used either alone of one type, or two or more types thereof may be used in combination.

The reaction conditions in each method may vary depending on the structure of the epoxy group and/or the structure of the mercapto group, and the like. In general, when the solvent is used, the reaction conditions may be appropriately determined by selecting from the concentration of any of various types of vinyl alcohol polymers (the vinyl alcohol polymer having the epoxy group on the side chain thereof, the vinyl alcohol polymer having a mercapto group on the side chain thereof, or the vinyl alcohol polymer having both the epoxy group and the mercapto group on the side chain thereof) being 5 to 90% by mass; when the epoxy group is reacted with the mercapto group, the molar ratio of the epoxy group to the mercapto group ([molar number of epoxy groups]/[molar number of mercapto groups]) being 0.1 to 2.0; the reaction temperature being 0 to 250° C.; and the reaction time period being 0.01 to 20 hrs. Moreover, in each method described above, a basic compound such as tertiary amine (for example, triethylamine, pyridine, etc.), phosphine (for example, tributylphosphine, triphenylphosphine, etc.), sodium hydroxide, tetraethylammonium hydroxide or sodium methylate is preferably used as a reaction catalyst.

The vinyl alcohol polymer having an epoxy group on the side chain thereof, the vinyl alcohol polymer having a mercapto group on the side chain thereof, and the vinyl alcohol polymer having both the epoxy group and the mercapto group on the side chain thereof described above (hereinafter, may be generically referred to as "vinyl alcohol polymer having an epoxy group and/or a mercapto group on the side chain thereof") may be obtained by saponifying a vinyl ester polymer having an epoxy group on the side chain thereof, a vinyl ester polymer having a thioester group on the side chain thereof, and a vinyl ester polymer having both the epoxy group and the thioester group on the side chain thereof (hereinafter, these may be generically referred to as "vinyl ester polymer having an epoxy group and/or a thioester group on the side chain thereof") respectively, by using, for example, an alkali catalyst. Thus, the vinyl alcohol polymer according to the embodiment of the present invention may be produced by allowing the saponification reaction in a vinyl ester unit included in these vinyl ester polymers having an epoxy group and/or a thioester group on the side chain thereof, and the reaction of the epoxy group with a mercapto group generated by the saponification reaction on the thioester group to concomitantly proceed (in a single reaction system), or the saponification reaction in a vinyl ester unit included in these vinyl ester polymer having an epoxy group and/or a thioester group on the side chain thereof, and the coupling reaction of mercapto groups generated by the saponification reaction on the thioester group to concomitantly proceed (in a single reaction system). Such a method is preferred since the vinyl alcohol polymer according to the embodiment of the present invention is obtained by a comparatively simple operation, leading to economical benefits. Specific examples of such a method include the following methods.

More specifically, provided that the vinyl alcohol polymer according to the embodiment of the present invention is crosslinked by the structure represented by the above formula (1) (vinyl alcohol polymer (A)), the vinyl alcohol polymer is preferably produced by:

a. a method in which as the reaction step (a), the first vinyl ester polymer having an epoxy group on the side chain thereof is saponified in the presence of the compound having at least two mercapto groups per molecule (first compound) by using the alkali catalyst so as to allow a saponification reaction in a vinyl ester unit included in the first vinyl ester polymer and a reaction of an epoxy group and a mercapto group to concomitantly proceed method; or b. a method in which as the reaction step (b), the second vinyl ester polymer having a thioester group on the side chain thereof is saponified in the presence of the compound having at least two epoxy groups per molecule (second compound) by using the alkali catalyst so as to allow a saponification reaction in a vinyl ester unit included in the second vinyl ester polymer and the reaction of the epoxy group with a mercapto group generated by the saponification reaction on the thioester group to concomitantly proceed.

Also, the vinyl alcohol polymer may be produced by a method in which as the reaction step (x), a third vinyl ester polymer having both an epoxy group and a thioester group on the side chain thereof is saponified by using the alkali catalyst so as to allow a saponification reaction in a vinyl ester unit included in the third vinyl ester polymer and the reaction of the epoxy group with a mercapto group generated by the saponification reaction on the thioester group to concomitantly proceed.

On the other hand, provided that the vinyl alcohol polymer according to the embodiment of the present invention is crosslinked by the disulfide structure (vinyl alcohol polymer (B)), the vinyl alcohol polymer is preferably produced by: c. a method in which as the reaction step (c), a second vinyl ester polymer having a thioester group on the side chain thereof is saponified by using an alkali catalyst so as to allow a saponification reaction in a vinyl ester unit included in the second vinyl ester polymer and the coupling reaction of mercapto groups generated by the saponification reaction on the thioester group to concomitantly proceed.

Provided that the vinyl alcohol polymer according to the embodiment of the present invention is produced by allowing the saponification reaction in a vinyl ester unit, and the reaction of the epoxy group with a mercapto group generated by the saponification reaction on the thioester group to concomitantly proceed, or by allowing the saponification reaction in a vinyl ester unit, and the coupling reaction of mercapto groups generated by the saponification reaction on the thioester group to concomitantly proceed, these reactions may be carried out either under a solvent-free condition, or in the presence of a solvent. In a case where the reaction is carried out in the presence of the solvent, the solvent type is not particularly limited, but when a compound having at least two mercapto groups per molecule, and/or compound having at least two epoxy groups per molecule are/is used, a solvent being capable of dissolving or swelling the same is preferred. Specific examples of the solvent include: alcohols such as methanol, ethanol, n-propyl alcohol and n-butyl alcohol; aromatic hydrocarbons such as benzene, toluene and xylene; ethers such as tetrahydrofuran, dioxane and diethyl ether; aliphatic hydrocarbons such as n-hexane; and the like, and these solvents may be used either alone of one type, or two or more types thereof may be used in combination.

Provided that the vinyl alcohol polymer according to the embodiment of the present invention is produced by allowing the saponification reaction in a vinyl ester unit, and the reaction of the epoxy group with a mercapto group generated by the saponification reaction on the thioester group to concomitantly proceed, or by allowing the saponification reaction in a vinyl ester unit, and the coupling reaction of mercapto groups generated by the saponification reaction on the thioester group to concomitantly proceed, the alkali catalyst is exemplified by sodium hydroxide, potassium hydroxide, sodium methoxide and the like, and sodium hydroxide is preferred.

Provided that the vinyl alcohol polymer according to the embodiment of the present invention is produced by allowing the saponification reaction in a vinyl ester unit, and the reaction of the epoxy group with a mercapto group generated by the saponification reaction on the thioester group to concomitantly proceed, or by allowing the saponification reaction in a vinyl ester unit, and the coupling reaction of mercapto groups generated by the saponification reaction on the thioester group to concomitantly proceed, the reaction conditions may vary depending on the structure of the epoxy group and/or the structure of the thioester group, and the like. In general, when the solvent is used, the reaction conditions may be appropriately determined by selecting from: the concentration of any of various types of vinyl ester polymers (the vinyl ester polymer having an epoxy group on the side chain thereof, the vinyl ester polymer having a thioester group on the side chain thereof, or the vinyl ester polymer having both the epoxy group and the thioester group on the side chain thereof) being 5 to 90% by mass; the molar ratio of the alkali catalyst to the vinyl ester unit ([molar number of alkali catalyst]/[molar number of vinyl ester units]) being 0.01 to 1.2; when the epoxy group is reacted with the mercapto group, the molar ratio of the epoxy group to the thioester group used ([molar number of epoxy groups]/[molar number of thioester groups]) being 0.1 to 2.0; the reaction temperature being 20 to 180° C.; and the reaction time period being 0.1 to 20 hrs.

Although a production method of the vinyl alcohol polymer having an epoxy group on the side chain thereof is not particularly limited, a method including: copolymerizing a vinyl ester with an epoxy group-containing vinyl compound; and then saponifying the resulting vinyl ester polymer having an epoxy group on the side chain thereof is suitable. Examples of the epoxy group-containing vinyl compound include allyl glycidyl ether, methallyl glycidyl ether, butadienemonoepoxide, 1,2-epoxy-5-hexene, 1,2-epoxy-7-octene, 1,2-epoxy-9-decene, 8-hydroxy-6,7-epoxy-1-octene, 8-acetoxy-6,7-epoxy-1-octene N-(2,3-epoxy) propylacrylamide, N-(2,3-epoxy) propylmethacrylamide, 4-acrylamidephenyl glycidyl ether, 3-acrylamidephenyl glycidyl ether, 4-methacrylamidephenyl glycidyl ether, 3-methacrylamidephenyl glycidyl ether, N-glycidoxymethylacrylamide, N-glycidoxymethylmethacrylamide, N-glycidoxyethylacrylamide, N-glycidoxyethylmethacrylamide, N-glycidoxypropylacrylamide, N-glycidoxypropylmethacrylamide, N-glycidoxybutylacrylamide, N-glycidoxybutylmethacrylamide, 4-acrylamidemethyl-2,5-dimethyl-phenyl glycidyl ether, 4-methacrylamidemethyl-2, 5-dimethyl-phenyl glycidyl ether, acrylamidepropyldimethyl(2,3-epoxy)propylammonium chloride, methacrylamidepropyldimethyl(2,3-epoxy)propylammonium chloride, glycidyl methacrylate, and the like.

Although a production method of the vinyl alcohol polymer having a mercapto group on the side chain thereof is not particularly limited, a method including: copolymerizing a vinyl ester with a thioester group-containing vinyl compound; and then saponifying the resulting vinyl ester polymer having a thioester group on the side chain thereof is suitable. The thioester group-containing vinyl compound is exemplified by a compound represented by the following formula (2), and the like.

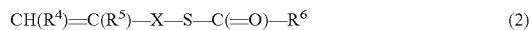

$$CH(R^4)=C(R^5)-X-S-C(=O)-R^6 \quad (2)$$

In the above formula (2), $R^4$ represents a hydrogen atom or a carboxyl group; $R^5$ represents a hydrogen atom, a methyl group, a carboxyl group or a carboxymethyl group; X represents a divalent group having 1 to 22 carbon atoms that includes a carbon atom and a hydrogen atom and which may include a nitrogen atom and/or an oxygen atom; $R^6$ represents a hydrogen atom or a hydrocarbon group having 1 to 8 carbon atoms (a methyl group, an ethyl group, a propyl group, a butyl group, etc.), wherein in a case where $R^4$ represents a carboxyl group, the carboxyl group can form a ring together with the hydroxyl group of an adjacent vinyl alcohol unit after the copolymerization and saponification, and similarly in a case where $R^3$ represents a carboxyl group or a carboxymethyl group, the carboxyl group or the carboxymethyl group can form a ring together with the hydroxyl group of an adjacent vinyl alcohol unit after the copolymerization and saponification.

Examples of the compound represented by the above formula (2) include thioacetic acid alkylene esters such as thioacetic acid S-8-nonen-1-yl ester, thioacetic acid S-7-octen-1-yl ester, thioacetic acid S-6-hepten-1-yl ester, thioacetic acid S-5-hexen-1-yl ester, thioacetic acid S-4-penten-1-yl ester, thioacetic acid S-3-buten-1-yl ester, and the like.

The type of the vinyl ester is not particularly limited, and examples of the vinyl ester include vinyl formate, vinyl acetate, vinyl propionate, vinyl butyrate, vinyl isobutyrate, vinyl pivalate, vinylversatate, vinyl caprate, vinyl caprylate, vinyl caprate, vinyl laurate, vinyl palmitate, vinyl stearate, vinyl oleate, vinyl benzoate, and the like. In light of economical viewpoints, vinyl acetate is preferred.

As the copolymerization procedure of the vinyl ester with the epoxy group-containing vinyl compound and/or the thioester group-containing vinyl compound, for example, an arbitrary polymerization technique such as bulk polymerization, solution polymerization, suspension polymerization, or emulsion polymerization may be adopted. Further, the copolymerization may be carried out in the absence of a solvent or in the presence of an alcohol solvent. Of these, solvent-free bulk polymerization or solution polymerization using an alcohol solvent may be suitably adopted. The alcohol solvent is not particularly limited, and for example, methanol, ethanol, propanol and the like may be used alone, or as a mixture of two or more types thereof. The copolymerization system is not particularly limited, and any of batch polymerization, semi-batch polymerization, continuous polymerization, semi-continuous polymerization may be employed.

The temperature in the copolymerization (copolymerization temperature) is not particularly limited. The copolymerization temperature is preferably 0 to 0° C., and more preferably 30 to 140° C. When the temperature is 0° C. or higher, a sufficient polymerization rate is likely to be attained. When the temperature is 200° C. or lower, degradation of vinyl acetate and/or the polyfunthonal monomer used can be sufficiently inhibited.

The procedure for controlling the copolymerization temperature is not particularly limited. The control procedure is exemplified by making a balance between heat generated by polymerization, and heat radiation from the surface of the polymerization vessel through adjust ing the polymerization rate. Alternatively, the procedure may involve use of an external jacket in which an appropriate heating medium is employed. In light of the safety, the latter procedure is preferred.

A polymerization initiator for use in the copolymerization may be appropriately selected depending on the polymerization technique from well-known initiators (for example, azo initiators, peroxide initiators, redox type initiators, etc.). Examples of the azo initiator include 2,2'-azobisisobutyronitrile, 2,2'-azobis(2,4-dimethylvaleronitrile), 2,2'-azobis(4-methoxy-2,4-dimethylvaleronitrile), and the like. Examples of the peroxide initiator include: percarbonate compounds such as diisopropyl peroxydicarbonate, di-2-ethylhexyl peroxydicarbonate and diethoxyethyl peroxydicarbonate; perester compounds such as t-butyl peroxyneodecanate, α-cumyl peroxyneodecanate and t-butyl peroxydecanate; acetylcyclohexylsulfonyl peroxide; 2,4,4-trimethylpentyl-2-peroxyphenoxyacetate; and the like. These initiators may be used in combination with potassium persulfate, ammonium persulfate, hydrogen peroxide or the like. Examples of the redox type initiator include initiators obtained by combining the peroxide with a reducing agent such as sodium bisulfite, sodium bicarbonate, tartaric acid, L-ascorbic acid or Rongalit, and the like. When the copolymerization was carried out at high temperature, a coloring that results from degradation of vinyl acetate may be found. In this instance, for the purpose of preventing the coloring, an antioxidant such as tartaric acid may be added to the polymerization system in an amount of about 1 to 100 ppm with respect to the vinyl ester.

In the copolymerization of the vinyl ester with the epoxy group-containing vinyl compound and/or the thioester group-containing vinyl compound, other monomer may be further copolymerized in addition to the foregoing monomers within a range not leading to impairment of principles of the present invention. Examples of the other monomer include: α-olefins such as ethylene and propylene; (meth) acrylic acids and salts thereof; (meth)acrylic acid esters such as methyl (meth)acrylate, ethyl (meth)acrylate, n-propyl (meth)acrylate, i-propyl (meth)arylate, n-butyl (meth)acrylate, i-butyl (meth)acrylate, t-butyl (meth)acrylate, 2-ethylhexyl (meth)acrylate, dodecyl (meth)acrylate and octadecyl (meth)acrylate; (meth)acrylamide; (meth)acrylamide derivatives such as N-methyl(meth)acrylamide, N-ethyl (meth)acrylamide, N,N-dimethyl (meth)acrylamide, diacetone(meth)acrylamide, (meth)acrylamidepropanesulfonic acid and salts thereof, (meth)acrylamidepropyldimethylamine and salts thereof or quaternary salts of the same, and N-methylol(meth)acrylamide and derivatives thereof; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether and stearyl vinyl ether; nitriles such as acrylonitrile and methacrylonitrile; halogenated vinyls such as vinyl chloride and vinyl fluoride; halogenated vinylidenes such as vinylidene chloride and vinylidene fluoride; allyl compounds such as allyl acetate and allyl chloride; unsaturated dicarboxylic acids such as maleic acid, itaonic acid and fumaric acid, and salt thereof or esters of the same; vinylsilyl compounds such as vinyltrimethoxysilane; isopropenyl acetate; and the like. The amount of copolymerization of such other monomers is typically 5 mol % or less with respect to the molar number of the entire structural units constituting the resultant vinyl ester polymer.

The copolymerization of the vinyl ester with the epoxy group-containing vinyl compound and/or the thioester group-containing vinyl compound may be carried out in the presence of a chain transfer agent within a range not leading to impairment of principles of the present invention, for the purpose of regulating the degree of polymerization, of the resultant vinyl ester polymer. Examples of the chain transfer agent include: aldehydes such as acetaldehyde and propionaldehyde; ketones such as acetone and methyl ethyl ketone; mercaptans such as 2-hydroxyethanethiol; halogenated hydrocarbons such as trichloroethylene and perchloroethylene; and the like. Of these, aldehydes and ketones may be suitably used. The amount of the chain transfer agent added may be predetermined depending on the chain transfer constant of the added chain transfer agent, and the degree of polymerization intended for the vinyl alcohol polymer, the amount is desirably about 0.1 to 10% by mass with respect to the vinyl ester, in general.

Although the degree of polymerization of the vinyl ester polymer having an epoxy group and/or a thioester group on the side chain thereof, the vinyl ester polymer being obtained by copolymerizing the vinyl ester with the epoxy group-containing vinyl compound and/or the thioester group-containing vinyl compound, is not particularly limited, the degree of polymerization may be within the range of 500 to 4,000, for example.

In the vinyl ester polymer having an epoxy group and/or a thioester group on the side chain thereof obtained by copolymerizing the vinyl ester with the epoxy group-containing vinyl compound and/or the thioester group-containing vinyl compound, from the viewpoint of e.g., making the finally obtained vinyl alcohol polymer insoluble in water, although the percentage content of the unit derived from the epoxy group-containing vinyl compound with respect to the molar number of the entire structural units constituting the vinyl ester polymer (amount of incorporation) may vary depending on the crosslinkage structure, the percentage content falls within the range of preferably 0.2 to 10 mol %, and more preferably 03 to 5 mol %. Further, although the percentage content of the unit derived from the thioester group-containing vinyl compound with respect to the molar number of the entire structural units constituting the vinyl ester polymer (amount of incorporation) may vary depending on the crosslinkage structure, the percentage content falls within the range of preferably 0.2 to 15 mol %, more preferably 0.6 to 10 mol %, and still more preferably 0.8 to 5 mol %.

The vinyl ester polymer having an epoxy group and/or a thioester group on the side chain thereof obtained by copolymerizing the vinyl ester with the epoxy group-containing vinyl compound and/or the thioester group-containing vinyl compound may be directly used as the vinyl ester polymer having an epoxy group and/or a thioester group on the side chain thereof for use in the methods "a" to "d" described above. On the other hand, when the vinyl ester polymer having an epoxy group and/or a thioester group on the side chain thereof is saponified, the aforementioned vinyl alcohol polymer having an epoxy group and/or mercapto group on the side chain thereof can be obtained.

The saponification procedure of the vinyl ester polymer having an epoxy group and/or a thioester group on the side chain thereof obtained by copolymerizing the vinyl ester with the epoxy group-containing vinyl compound and/or the thioester group-containing vinyl compound is not particularly limited, and a well-known saponification procedure may be adopted. A saponification reaction (including an alcoholysis reaction) in which, for example, a basic catalyst such as sodium hydroxide, potassium hydroxide or sodium methoxide, or an acidic catalyst such as p-toluenesulfonic acid is used may be exemplified. Examples of the solvent which may be used in this reaction include alcohols such as methanol and ethanol; esters such as methyl acetate and ethyl acetate; ketones such as acetone and methyl ethyl ketone: aromatic hydrocarbons such as benzene and toluene; and the like. These solvents may be used either alone of one type, or in combination of two or more thereof. Of these, saponification by using methanol or a methanol/methyl acetate mixed solution as a solvent, with sodium hydroxide as a catalyst is preferred due to the convenience.

The compound having at least two mercapto groups per molecule which may be used as the crosslinking agent is not particularly limited, and examples of the compound include "Capcure" 3-800LC (manufactured by BASF Ltd.) "POLYTHIOL" QE-340M (manufactured by Toray Fine Chemicals Co., Ltd.) "THIOKOL LP" (manufactured by Toray Fine Chemicals Co., Ltd.) "KarenzMT" PE1 (manufactured by Showa Denko K.K.) "KarenzMT" BD1 (manufactured by Showa Denko K.K.) "KarenzMT" NR1 (manufactured by Showa Denko K.K.), trimethylolpropane tris(3-mercaptobutyrate), trimethylolethane tris(3-mercaptobutyrate), and the like.

The compound having at least two epoxy groups per molecule which may be used as the crosslinking agent is not particularly limited, and examples of the compound include 1,4-butanediol diglycidyl ether, 1,6-hexanediol diglycidyl ether, cyclohexanedimethanol diglycidyl ether, trimethylolpropane diglycidyl ether, trimethylolpropane triglycidyl ether, ethylene glycol diglycidyl ether, diethylene glycol diglycidyl ether, polyethylene glycol diglycidyl ether, glycerin diglycidyl ether, glycerin triglycidyl ether, diglycerin diglycidyl ether, diglycerin triglycidyl ether, diglycerin tetraglycidyl ether, polyglycerin polyglycidyl ether, and the like. The crosslinking agent may be used either alone of one type or in combination of two or more types.

Additive for a Drilling Mud

The additive for a drilling mud according to another embodiment of the present invention contains the vinyl alcohol polymer according to the embodiment of the present invention, and enables a desired drilling mud to be prepared by adding the same. Furthermore, the vinyl alcohol polymer is desirably contained in a powdery form. The drilling mud according to the another embodiment of the present invention may either consist of only the vinyl alcohol polymer according to the embodiment of the present invention, or contain various types of additives, etc. The percentage content of the vinyl alcohol polymer according to the embodiment of the present invention in the drilling mud according to the another embodiment of the present invention may be, for example, at least 50% by mass, and more preferably at least 80% by mass.

Drilling Mud and Production Method Thereof

The drilling mud according to still another aspect of the present invention plays roles in, for example: transporting drilled clasts, drilling wastes and the like; improving lubricating properties of bits and drill pipes; filling in holes on the porous ground; balancing out the reservoir pressure that results from the hydrostatic pressure (pressure from the rock stratum); and the like. This drilling mud contains the aforementioned additive for a drilling mud, and also contains water and a muddy material as principal components. The drilling mud may also contain optional component(s) within a range not leading to impairment of the effects of the present invention.

Such a drilling mud is produced by mixing a muddy material, water, and the additive for a drilling mud. Specifically, the drilling mud may be produced by adding the additive for a drilling mud, and as needed, optional component(s) to a water-clay suspension liquid, as a base, which was prepared by dispersing and suspending the muddy material in water.

The content of the vinyl alcohol polymer in the drilling mud is preferably at least 0.5 kg/m$^3$ and 40 kg/m$^3$ or less, and more preferably at least 3 kg/m$^3$ and 30 kg/m$^3$ or less.

Muddy Material

Examples of the muddy material include bentonite, attapulgite, sericite, a hydrous silicic acid magnesium salt and the like, and of these, bentonite is preferred.

The amount of the muddy material blended in the drilling mud is preferably 5 g to 300 g, and more preferably 10 g to 0 g with respect to 1 kg of the water used in the drilling mud.

Optional Components

As the optional components, well-known additives may be used, and for example, an aqueous solution of a copolymer of an α-olefin having 2 to 12 carbon atoms with maleic anhydride, or a derivative thereof (for example, maleic acid amide, maleic acid imide), an alkali-neutralization product thereof, or the like; a dispersant, a pH-adjusting agent, a defoaming agent, a thickening agent, and the like may be included. The copolymer of an α-olefin having 2 to 12 carbon atoms with maleic anhydride, or a derivative thereof is exemplified by copolymers of an α-olefin such as ethylene, propylene, butene-1, isobutene or diisobutylene with maleic anhydride, or derivatives thereof (for example, Kuraray Co., Ltd., "ISOBAM"), and the dispersant is exemplified by a humic acid dispersant, a lignin dispersant and the like, and of these, the lignin dispersant containing a sulfonic acid salt is preferred.

Additive for a Drilling Cement Slurry

The additive for a drilling cement slurry according to other embodiment of the present invention contains the vinyl alcohol polymer according to the embodiment of the present invention, and enables a desired drilling cement slurry to be prepared by adding the same. Furthermore, the vinyl alcohol polymer is desirably contained in a powdery form. The drilling cement slurry according to the another embodiment of the present invention may either consist of only the vinyl alcohol polymer according to the embodiment of the present invention, or contain various types of additives, etc. The percentage content of the vinyl alcohol polymer according to the embodiment of the present invention in the drilling cement slurry according to the another embodiment of the present invention may be, for example, at least 50% by mass, and more preferably at least 80% by mass.

Drilling Cement Slurry and Production Method Thereof

The drilling cement slurry according to still other embodiment the present invention is for use in: fixation of the casing pipe into the well; and protection of the inner wall in the well by, being injected into and hardened in, for example, tubular void portions between the stratum and the casing pipe installed in the well. The drilling cement slurry contains the additive for a drilling cement slurry, as well as a hardening powder and a liquid. The drilling cement slurry may contain optional component(s), within the range not leading to impairment of the effects of the present invention.

Such a drilling cement slurry is produced by adding the additive for a drilling cement slurry, as well as the liquid and the hardening powder, and as needed, optional component(s) and mixing using a stirrer or the like.

However, in the drilling cement slurry, the particle size of the vinyl alcohol polymer powder added as the additive for a drilling cement slurry is not particularly limited, and the vinyl alcohol polymer powder passes through preferably a 10-mesh sieve according to JIS, more preferably a 16-mesh sieve according to JIS, and particularly preferably a 30-mesh sieve according to JIS. When the vinyl alcohol polymer powder has the particle size that enables passage through a 30-mesh sieve, the cement slurry containing the vinyl alcohol polymer having such a particle size can further inhibit the dehydration from the cement slurry at high temperatures.

The content of the vinyl alcohol polymer powder in the drilling cement slurry is preferably at least 0.1% by mass (BWOC) and 2.0% by mass or less (BWOC), and more preferably at least 0.2% by mass (BWOC) and 1.0% by mass or less (BWOC). It is to be noted that "BWOC" means "By Weight Of Cement" which is indicated on mass basis of the cement.

Hardening Powder

The hardening powder is exemplified by Portland cement, mixed cement, eco-cement, special cement and the like, preferably water-hardening cement which is solidified through a reaction with water, and when the cement slurry is used for drilling, geothermal-well cement, and oil-well cement are preferred.

The Portland cement is exemplified by those defined according to JIS R5210: 2009, and specific examples include ordinary Portland cement, high-early-strength Portland cement, ultra high-early-strength Portland cement, moderate heat Portland cement, low-heat Portland cement, sulfate resisting Portland cement and low-alkali Portland cement.

The mixed cement is exemplified by those defined according to JIS R5211 to 5213: 2009, and specific examples include blast-furnace slag cement, fly ash cement and silica cement.

The special cement may include those prepared using the Portland cement as a base, those prepared by changing the component and/or the particle grade constitution of the Portland cement, and those containing components differing from the Portland cement. The special cement prepared using the Portland cement as a base is exemplified by distensible cement, low heat cement of a two-component system, and low heat cement of a three-component system. The special cement prepared by changing the component and/or the particle grade constitution of the Portland cement is exemplified by white Portland cement, a cement type hardening material (geocement) ultrafine particle cement and high-belite type cement. The special cement containing components differing from the Portland cement is exemplified by rapid hardening cement, alumina cement, phosphate cement and non-hydraulic cement.

Liquid

The liquid may be selected depending on the type of the hardening powder, and is exemplified by water, a solvent, and a mixture of the same. In general, water is used.

The ratio of the hardening powder to the liquid in the drilling cement slurry may be appropriately predetermined depending on the specific gravity of the intended slurry as well as the strength of the hardened product, etc. For example, when the drilling cement slurry is constituted as a drilling cement slurry with the water-hardening cement, the mass ratio (W/C) of water to cement is preferably at least 0.25 and 1.00 or less, and more preferably at least 0.30 and 0.80 or less, from the viewpoints of the specific gravity of the slurry, as well as the strength of the hardened product.

Optional Components

As the optional component, a dispersant, a retardant and/or a defoaming agent may be contained, and additive(s) other than these may be also contained.

The dispersant is exemplified by a naphthalenesulfonic acid-formalin condensate, a melaminesulfonic acid-formalin condensate, an anionic macromolecule such as a polycarboxylic acid polymer, and of these, naphthalenesulfonic acid-formalin condensate is preferred. The content of the dispersant is typically at least 0.05% by mass (BWOC) and 2% by mass (BWOC) or less, and preferably at least 0.2% by mass (BWOC) and 1% by mass (BWOC) or less.

The retardant is exemplified by oxycarboxylic acid and salts thereof, saccharides such as monosaccharides and polysaccharides, and of these, the saccharides are preferred. The content of the retardant is typically at least 0.005% by mass (BWOC) and 1% by mass (BWOC) or less, and preferably at least 0.02% by mass (BWOC) and 0.3% by mass (BWOC) or less.

The defoaming agent is exemplified by an alcoholalkyleneoxide adduct, a fatty acid alkyleneoxide adduct, polypropylene glycol, a fatty acid soap, a silicon compound and the like, and of these, a silicon compound is preferred. The content of the defoaming agent is typically at least 0.0001% by mass (BWOC) and 0.1% by mass (BWOC) or less, and preferably at least 0.001% by mass (BWOC) and 0.05% by mass (BWOC) or less.

Other Additives

Taking into consideration the intended use, the composition and the like, the drilling cement slurry may contain additives such as, e.g., a cement accelerator, a low-density additive, a high-density additive, a foaming agent, a crack preventive agent, a bubbling agent, an AE agent, a cement-distensible agent, a cement strength stabilizer, a fine aggregate such as a silica powder, a silica fume, a fly ash, a limestone powder and a crushed sand, a coarse aggregate such as a crushed stone, a hollow balloon and the like. Further, these additives may be used alone of one type, or two or more types thereof may be used in combination.

EXAMPLES

Hereinafter, the present invention will be described in detail by way of Examples and Comparative Examples, but the present invention is not in any how limited to these Examples.

Example 1

Production of Vinyl Alcohol Polymer

Into a 3-L reaction vessel equipped with a stirrer, a nitrogen-feeding port, an additive-feeding port and an initiator addition port were charged 1,200 g of vinyl acetate, 400 g of methanol, and as an epoxy group-containing vinyl compound, 16.1 g of allyl glycidyl ether, and the temperature of the mixture was elevated to 60° C. Thereafter, nitrogen was bubbled for 30 min to replace inside the system by nitrogen. The internal temperature of the reaction vessel was adjusted to 60° C., and 1.5 g of 2,2'-azobis(isobutyronitrile) was added thereto to start the polymerization. During the polymerization, the polymerization temperature was maintained at 60° C., and 5 hrs later when the conversion rate of polymerization reached 40%, the mixture was cooled to stop the polymerization. Next, unreacted vinyl acetate was eliminated under a reduced pressure to obtain a solution of polyvinyl acetate (PVAc) in methanol. A part of the methanol solution of PVAc thus obtained was subjected to repeated purification through reprecipitation five times using acetone as a good solvent, and hexane as a poor solvent. After drying in vacuo, the resulting PVAc was dissolved into deuterochloroform, and a measurement on $^1$H-NMR was performed. From the NMR spectrum obtained, the amount of modification of allyl glycidyl ether was determined to be 1.0 mol %.

The PVAc solution in methanol was charged into a 1-L reaction vessel such that the mass of PVAc was 50 g, and methanol was added thereto to adjust the concentration to 30% by mass. Thereafter, as a compound having at least two mercapto groups per molecule (crosslinking agent), 4.0 g of "Polythiol" QE-340M manufactured by Toray Fine Chemicals Co., Ltd. was charged. Under this condition, a molar ratio of the epoxy groups being present in the reaction liquid to the mercapto groups ([molar number of epoxy groups]/[molar number of mercapto groups]) used was 1/1. The temperature of the reaction liquid was adjusted to 40° C., and a NaOH solution in methanol (10% by mass concentration) was added thereto such that the alkali molar ratio ([molar number of NaOH]/[molar number of vinyl ester units constituting PVAc]) became 0.05 to perform the saponification reaction. After 60 min from the start of the reaction, the resulting gelatinous matter was ground, and then dried with a hot-air dryer at 100° C. for 3 hrs. The dry powder thus obtained was further ground with a grinder, and 10 g of vinyl alcohol polymer in a powdery form that passes through a 30-mesh sieve according to JIS was collected.

Water Solubility of Vinyl Alcohol Polymer

The vinyl alcohol polymer obtained as described above was charged into 300 g of water at 95° C. which had been placed beforehand in a 500-mL beaker so as to give a concentration of 4% by mass. The mixture was stirred by using a magnetic stirrer with a stirrer bar in a length of 3 cm at a rotation frequency of 280 rpm under a condition of a temperature of 95° C. for 3 hrs while evaporation of water is prevented. Then, an evaluation was made as to whether or not the vinyl alcohol polymer was completely dissolved (complete dissolution). The evaluation was made as: "soluble" when complete dissolution was observed; and "insoluble" when complete dissolution failed. In Example 1, the evaluation was made as "insoluble" since insoluble particles were found even after the stirring for 3 hrs.

Preparation of Drilling Mud

Into a cup of Hamilton Beach Mixer was weighed 300 mL of ion exchanged water, and thereto was added 18 g of bentonite (manufactured by TELNITE CO. LTD., "TELGEL E"). After the mixture was sufficiently stirred, the mixture was left to stand for 24 hrs in order to allow bentonite to be sufficiently swollen. To this dispersion liquid of bentonite, 1.5 g of the vinyl alcohol polymer obtained as described above was added as an additive for a drilling mud to obtain a drilling mud.

Evaluation of Characteristics of Drilling Mud

The temperature of the drilling mud obtained as described above was adjusted to 25° C., and the viscosity was measured using a B type viscometer, revealing the viscosity of 58 mPa·s. Next, the amount of dehydration of this drilling mud at a high temperature under a high pressure was measured. The measurement was carried out by using HPHT Filter Press Series 387, manufactured by Fann Instrument company, after the drilling mud was charged into the cell in which the temperature had been adjusted to 150° C. and was left to stand for 1 hour. In the measurement, the pressure was applied from both the above and below the cell, and the amount of dehydration was measured under a condition with the differential pressure therebetween of 500 psi. The amount of dehydration for 30 min was 12 mL.

Examples 2 to 7

Drilling muds were prepared in a similar manner to Example 1 except that the vinyl alcohol polymer each used in the preparation of the drilling mud was changed as shown in Table 1, and the evaluations of their characteristics were carried out. The results are shown in Table 1. It is to be noted that the amount of the thioester group in the monomer of the copolymer used was counted in the amount of the added mercapto group with the proviso that the thioester group would be converted into the mercapto group. In all cases in which any of the vinyl alcohol polymer was used, the prepared drilling mud had a low viscosity, and the amount of dehydration at 150° C. was very low as to be 20 mL or less.

Comparative Examples 1 to 8

Drilling muds were prepared in a similar manner to Example 1 except that the vinyl alcohol polymer each used in the preparation of the drilling mud was changed as shown in Table 1, and the evaluations of their characteristics were carried out. The results are shown in Table 1.

TABLE 1

| | Vinyl alcohol polymer | | | | | | Evaluations of characteristics of drilling mud | |
|---|---|---|---|---|---|---|---|---|
| | copolymerization monomer (epoxy group or thioester group-containing vinyl compound) | | crosslinking agent | | | | | |
| | | | | amount of addition [2] epoxy group/ | | | | |
| | type | amount of incorporation (mol %) | type [1] | mercapto group (mol/mol) | particle size | water solubility | viscosity (mPa·s) | amount of dehydration (mL) |
| Example 1 | allyl glycidyl ether | 1.0 | a | 1/1 | 30 mesh pass | insoluble | 58 | 12 |
| Example 2 | allyl glycidyl ether | 1.0 | a | 1/2 | 30 mesh pass | insoluble | 57 | 11 |
| Example 3 | allyl glycidyl ether | 0.5 | a | 1/1 | 30 mesh pass | insoluble | 65 | 17 |
| Example 4 | allyl glycidyl ether | 0.5 | a | 1/2 | 30 mesh pass | insoluble | 60 | 18 |
| Example 5 | thioacetic acid S-7-octen-1-yl ester | 1.0 | b | 1/1 | 30 mesh pass | insoluble | 65 | 17 |
| Example 6 | thioacetic acid S-7-octen-1-yl ester | 1.0 | b | 0.5/1 | 30 mesh pass | insoluble | 70 | 19 |
| Example 7 | thioacetic acid S-7-octen-1-yl ester | 2.0 | absent | 0/1 | 30 mesh pass | insoluble | 67 | 18 |
| Comparative Example 1 | absent | | | | | | 136 | >150 |
| Comparative Example 2 | PVA-224 manufactured by Kuraray Co., Ltd. | | | | 30 mesh pass | soluble | >10,000 | 34 |
| Comparative Example 3 | PVA-224S manufactured by Kuraray Co., Ltd. | | | | 83 mesh pass | soluble | >10,000 | 37 |
| Comparative Example 4 | PVA-224 manufactured by Kuraray Co., Ltd., added after dissolving in water beforehand | | | | — | soluble | >10,000 | 45 |
| Comparative Example 5 | PVA-117 manufactured by Kuraray Co., Ltd. | | | | 30 mesh pass | soluble | 60 | 32 |
| Comparative Example 6 | PVA-117 manufactured by Kuraray Co., Ltd., added after dissolving in water beforehand | | | | — | soluble | >10,000 | 33 |
| Comparative Example 7 | allyl glycidyl ether | 0.1 | a | 1/1 | 30 mesh pass | soluble | 61 | 35 |
| Comparative Example 8 | thioacetic acid S-7-octen-1-yl ester | 0.5 | absent | 0/1 | 30 mesh pass | soluble | 63 | 36 |

[1] a: manufactured by Toray Fine Chemicals Co., Ltd., "Polythiol" QE-340M, b: ethylene glycol diglycidyl ether

[2] the thioester group amount being included in the amount of the added mercapto group with the proviso that the thioester group would be converted into the mercapto group.

Comparative Example 1 shows the results of the evaluations of the drilling mud to which the vinyl alcohol polymer was not added, indicating the result of the amount of dehydration being very high, exceeding 150 mL.

In Comparative Examples 2 to 4, results of addition of PVA-224 (degree of saponification: 88 mol %; and degree of polymerization: 2,400) or PVA-224S (that passes through a 83-mesh sieve according to JIS, with degree of saponification: 88 mol %; and degree of polymerization: 2,400), a commercially available water soluble vinyl alcohol polymer, manufactured by Kuraray Co., Ltd., were demonstrated. In every case, the prepared drilling mud had a very high viscosity of exceeding 10,000 mPa·s, and the amount of dehydration was also comparatively large, which was at least 30 mL. It is to be note that in Comparative Example 4, PVA-224 was added after dissolving in water beforehand.

In Comparative Examples 5 and 6, results of addition of PVA-117 (degree of saponification: 98.5 mol % and degree of polymerization: 1,700), a commercially available water soluble vinyl alcohol polymer, manufactured by Kuraray Co., Ltd. were demonstrated. In the case in which the powder having a particle size that allows for passing through a 30-mesh sieve (30 mesh pass) was added (Comparative Example 5), the prepared drilling mud had a viscosity of as low as 60 mPa·s, but the amount of dehydration was comparatively large, which was at least 30 mL. On the other hand, when PVA-117 was added after dissolving in water beforehand (Comparative Example 6), the viscosity was very high of exceeding 10,000 mPa·s, and the amount of dehydration was also comparatively large, which was at least 30 mL.

In Comparative Examples 7 and 8, the vinyl alcohol polymers were each crosslinked by way of a reaction of an epoxy group and a mercapto group, or by way of a coupling reaction of mercapto groups, revealing a small degree of crosslinking, and being "soluble" in water at 95° C. In addition, the prepared drilling mud had a viscosity of as low as 61 mPa·s or 63 mPa·s; however, the amount of dehydration in both cases was comparatively large, which was at least 30 mL.

As shown in Examples above, when the vinyl alcohol polymers according to the embodiment of the present invention being crosslinked by the structure represented by the formula (1) and/or the disulfide structure, and being insoluble in water was used in the preparation of a drilling mud, the viscosity was low and the dehydration at high temperatures was inhibited, indicating that the vinyl alcohol polymers were very useful.

Example 8

Preparation of Cement Slurry

A cement slurry (S-1) was prepared by charging into a juice mixer, 4 g of the vinyl alcohol polymer powder produced in Example 1, together with 320 g of ion exchanged water, 800 g of class H cement for wells, 4 g of naphthalenesulfonic acid-formalin condensate sodium salt (Dipersity Technologies Inc., "Daxad-19") and 0.16 g of lignosulfonic acid sodium salt (Lignotech USA, Inc., "Keling 32L"), and then mixing with stirring. It is to be noted that the amount of the vinyl alcohol polymer powder added was 0.5% by mass on mass basis of the cement (BWOC).

Comparative Example 9

A cement slurry was prepared in a similar manner to Example 8 except that PVA-224 manufactured by Kuraray Co., Ltd. (that passes through a 30-mesh sieve according to JIS, with degree of saponification: 88 mol %; and degree of polymerization: 2,400) was used.

Comparative Example 10

A cement slurry was prepared in a similar manner to Example 8 except that PVA-224S manufactured by Kuraray Co., Ltd. (that passes through a 83-mesh sieve according to JIS, with degree of saponification: 88 mol %; and degree of polymerization: 2,400) was used.

Comparative Example 11

A cement slurry was prepared in a similar manner to Example 8 except that PVA-124 manufactured by Kuraray Co., Ltd. (that passes through a 30-mesh sieve according to JIS, with degree of saponification: 98.5 mol %; and degree of polymerization: 2,400) was used.

Evaluations

The cement slurries of Example 8 and Comparative Examples 9 to 11 were evaluated regarding the viscous characteristic and the amount of dehydration in accordance with the following procedures. The results of the evaluations are shown in Table 2.

Viscous Characteristic

The viscous characteristics were evaluated in terms of plastic viscous characteristic (PV) and yield value (YV). The plastic viscous characteristic (PV) is a flow resistance value generated by mechanical friction of solid contents included in the cement slurry. The yield value (YV) is a shearing force required for continuing flowing when a fluid is in a flowing state, and is a flow resistance generated by a tractive force among solid particles included in the cement slurry.

The plastic viscous characteristic (PV) and the yield value (YV) were measured according to the method described in "Appendix H" of "API10" (American Institute Specification 10), after adjusting the temperature of the cement slurry to 25° C. or 90° C. It is to be noted that the plastic viscous characteristic (PV) and the yield value (YV) were each calculated in accordance with the following formula.

plastic viscous characteristic $(PV)$=[(reading at 300 rpm)−(reading at 100 rpm)]×1.5 yield value $(YV)$=[(reading at 300 rpm)−(plastic viscous characteristic)]

Amount of Dehydration

The amount of dehydration was measured according to the method described in "Appendix H" of "API10" (American Institute Specification 10), in terms of the amount dehydrated from the cement slurry having the temperature adjusted to 90° C. for 30 min, under a condition of the differential pressure of 1,000 psi.

TABLE 2

| | Vinyl alcohol polymer | | | | | | Evaluations of cement slurry | | | |
|---|---|---|---|---|---|---|---|---|---|---|
| | copolymerization monomer | | crosslinking agent | | | | | viscous characteristic | | amount of |
| | | amount of | | amount of addition epoxy group/ mercapto group | particle | water | amount of added PVA | | YV | dehydration |
| | type | incorporation (mol %) | type | (mol/mol) | size | solubility | (% by mass) | PV (cp) | (lb/100 ft²) | (mL) |
| Example 8 | allyl glycidyl ether | 1.0 | a) | 1/1 | 30 mesh pass | insoluble | 0.5 | 32 (25° C.) 40 (90° C.) | 2 (25° C.) 7 (90° C.) | 22 |
| Comparative Example 9 | PVA-224 manufactured by Kuraray Co., Ltd. | | | | 30 mesh pass | soluble | 0.5 | 82 (25° C.) 37 (90° C.) | 10 (25° C.) 8 (90° C.) | 372 |
| Comparative Example 10 | PVA-224S manufactured by Kuraray Co., Ltd. | | | | 83 mesh pass | soluble | 0.5 | 86 (25° C.) 36 (90° C.) | 11 (25° C.) 8 (90° C.) | 313 |
| Comparative Example 11 | PVA-124 manufactured by Kuraray Co., Ltd. | | | | 30 mesh pass | soluble | 0.5 | 35 (25° C.) 42 (90° C.) | 2 (25° C.) 10 (90° C.) | 295 | a) manufactured by Toray Fine Chemicals Co., Ltd., "Polythiol" QE-340M

As is clear from the results shown in Table 2, the cement slurry of Example 8 had a superior viscous characteristic, and the amount of dehydration at 90° C. was each 22 mL, indicating inhibited dehydration at high temperatures.

On the other hand, the cement slurries of Comparative Examples 9 to 11 failed to sufficiently inhibit the dehydration of the cement slurry at 90° C., which may result from the use of the water soluble vinyl alcohol polymer powder.

The invention claimed is:

1. A vinyl alcohol polymer comprising molecular main chains crosslinked therebetween by a structure represented by formula (1), wherein the vinyl alcohol polymer is not completely dissolved in a mixture prepared by: adding the vinyl alcohol polymer to water so as to give a concentration of 4% by mass; and stirring at 95° C. for 3 hrs,

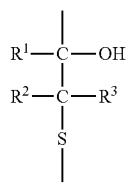

(1)

wherein $R^1$, $R^2$, and $R^3$ each independently represent a hydrogen atom or a substituted or unsubstituted hydrocarbon group having 8 or less carbon atoms.

2. The vinyl alcohol polymer according to claim 1, which is in a powdery form.

3. The vinyl alcohol polymer according to claim 2, which passes through a 10-mesh sieve according to JIS.

4. The vinyl alcohol polymer according to claim 1, which is the vinyl alcohol polymer comprising molecular main chains crosslinked therebetween by the structure represented by the formula (1), wherein the structure represented by the formula (1) is formed by a reaction of an epoxy group and a mercapto group.

5. A method of producing the vinyl alcohol polymer according to claim 4, the method comprising:
reacting a first vinyl alcohol polymer comprising an epoxy group on a side chain thereof with a first compound comprising at least two mercapto groups per molecule.

6. A method of producing the vinyl alcohol polymer according to claim 4, the method comprising:
reacting a second vinyl alcohol polymer comprising a mercapto group on a side chain thereof with a second compound comprising at least two epoxy groups per molecule.

7. The method according to claim 5, wherein, in the reacting, a first vinyl ester polymer comprising an epoxy group on a side chain thereof is saponified in the presence of the first compound by using an alkali catalyst so as to allow a saponification reaction in a vinyl ester unit and a reaction of an epoxy group and a mercapto group to concomitantly proceed.

8. The method according to claim 6, wherein in the reacting, a second vinyl ester polymer comprising a thioester group on a side chain thereof is saponified in the presence of the second compound by using an alkali catalyst so as to allow a saponification reaction in a vinyl ester unit and a reaction of the epoxy group with a mercapto group generated by the saponification reaction on the thioester group to concomitantly proceed.

9. An additive for a drilling mud comprising the vinyl alcohol polymer according to claim 1.

10. A drilling mud comprising as an additive, the vinyl alcohol polymer according to claim 1.

11. An additive for a drilling cement slurry comprising the vinyl alcohol polymer according to claim 1.

12. A drilling cement slurry comprising as an additive, the vinyl alcohol polymer according to claim 1.

* * * * *